P., E. W. & J. A. Blake,
Furniture Caster.
No. 74. Reissued July 30, 1845.
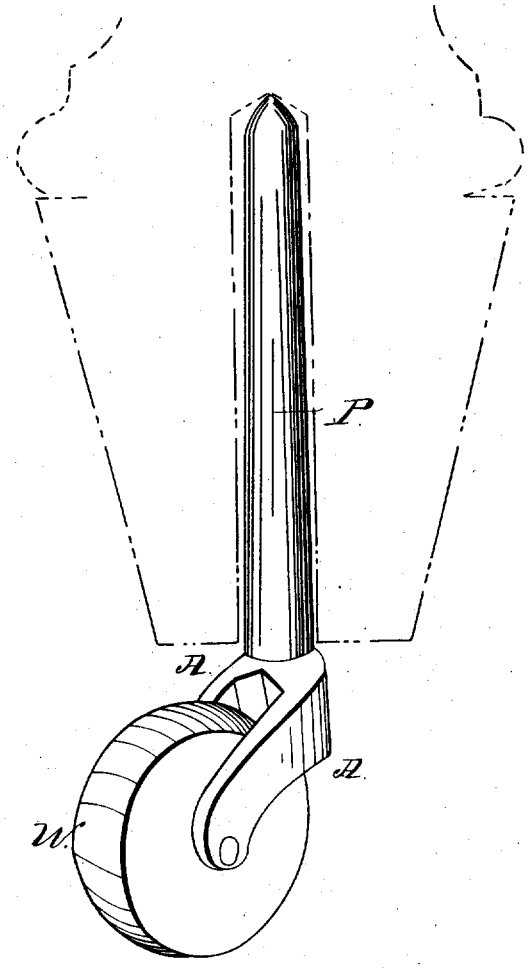
AM. PHOTO-LITHO. CO. N.Y. (OSBORNE'S PROCESS.)

UNITED STATES PATENT OFFICE.

PHILOS BLAKE, ELI W. BLAKE, AND JOHN A. BLAKE, OF NEW HAVEN, CONN.

IMPROVEMENT IN THE MODE OF CONSTRUCTING CASTERS AND APPLYING THEM TO BEDSTEADS.

Specification forming part of Letters Patent No. 821, dated June 30, 1838; Reissue No. 74, dated July 30, 1845.

*To all whom it may concern:*

Be it known that we, PHILOS BLAKE, ELI W. BLAKE, and JOHN A. BLAKE, of New Haven, in the county of New Haven and State of Connecticut, have invented a new and useful Improvement in the Mode of Constructing Casters and Applying them to Wooden Furniture; and we do hereby declare that the following is a full and exact description thereof.

Our improvement is in that class of casters which have a revolving vertical axle or pintle. Such casters in all the various forms in which they were known prior to our invention were provided with a sheath of metal or other metallic appendage, within and upon which the pintle revolved, and to which it was attached, the same having been in all cases a constituent part of the caster when vended as an article of hardware; and in applying casters so made the said sheath or other metallic appendage has been inserted into a hole bored in the leg of the fabric, or otherwise variously attached, according to the particular structure of the said appendage.

Our improvement consists, chiefly, in dispensing with such appendage or additional constituent part by causing a simple hole bored in the leg of the fabric to subserve the purposes of a sheath, within which the pintle is to revolve, and upon which it is to bear, the pintle being made of such form and dimensions as to allow and adapt it to be used in that manner.

In the annexed drawing the shaded parts represent in perspective our caster complete in all its parts ready for application.

W is the wheel; A A, the arms between which the wheel revolves, and P the vertical axle or pintle.

The dotted lines show a section of the leg of a bedstead to which it has been applied with the hole bored therein to receive the pintle. Casters with a revolving vertical axle as heretofore made have usually had that axle very short, not often exceeding an inch in length. When the pintle is made thus short, the employment of a metal sheath is indispensable, because the lateral pressure of the pintle at its extremities is so great that wood will not sustain it; but since this lateral pressure will be diminished in proportion to the length of the pintle it will be readily seen that by a suitable extension of the pintle it will be so far reduced that the wood will be competent to sustain it. The length of pintle represented in the drawing we deem sufficient to secure that end in a caster of the size shown, and in general the length of the pintle should be equal to at least twice the diameter of the wheel employed.

In order that the vertical pressure arising directly from the weight of the fabric may come where the wood is most competent to sustain it, we suit the pintle to the reception of the weight of the fabric upon its upper end, because the wood at the interior extremity of the hole being bound together in every direction by the surrounding timber is therefore competent to endure the greater pressure without yielding. The placing the weight on the end of the pintle is also important, because the friction arising from the direct pressure tending to obstruct the traverse of the caster is thereby reduced to the lowest practicable limit. We make the pintle tapering in order to prevent its sides from interfering with the sides of the hole in case the latter should not be perfectly straight, it being liable to be somewhat crooked when bored into the end of the grain. We form the end of the pintle, into a conical point, and a conical cavity is made in the wood to receive it, as shown in the drawing, by which means the tapered pintle is governed at its upper end and kept in proper perpendicular position. All other casters have been so constructed that when applied they could not be removed from the fabric without the employment of tools for that purpose, and have never been designed to be removed while in use; but this caster may be instantly removed from the fabric and replaced at pleasure. This is a new property in a caster, and highly useful in many cases. It is particularly useful when the caster is applied to bedsteads, because the bedstead may thereby be more easily taken to pieces and put together, and may be transported with less danger of breaking the casters. Also, by this means the caster may at any moment be taken off and oiled to prevent the squeaking noise which will occur in all casters after long use.

We are aware that the pintle of casters has sometimes been made as long, or even longer, than we make it; also, that it has sometimes been made tapering and terminating in a conical point, and said point has been inserted into a conical cavity and has sustained the weight of the fabric, not, however, directly, but through the medium of an additional metallic appendage. There is, therefore, nothing in these features, in themselves considered, whether taken severally or collectively, which we claim as our invention.

In all other casters heretofore made the pintle has been provided with a key-hole, pin-hole, groove, or other preparation to secure the same to an additonal appendage or constituent part. In the pintle of our caster as herein described no provision of the kind is made. With the exception of this difference there is nothing in the construction of our caster as manufactured ready for application which distinguishes it from what had been sometimes known as constituting a part of a caster. Considered, however, as a complete caster, ready for application and use as such, it is a new article, essentially different from any caster heretofore known in market or elsewhere, all others having been provided with expensive additional constituent parts.

What we claim as our invention, and wish to secure by Letters Patent, is—

The combining of the pintle directly with the wooden leg of the furniture without the intervention of the sheath or other appendage of metal heretofore employed, the same being done in the manner herein set forth—that is to say, the pintle being made of sufficient length to adapt it to that end, as described, and inserted into a hole in the leg bored of such depth as that the burden may rest upon the upper end of the pintle.

PHILOS BLAKE.
ELI W. BLAKE.
JOHN A. BLAKE.

Witnesses:
WILLIAM LLOYD,
CHESTER WARNER.